United States Patent [19]

Jordan

[11] 4,435,630
[45] Mar. 6, 1984

[54] STUD WELDING APPARATUS

[75] Inventor: Ernst G. Jordan, Menden, Fed. Rep. of Germany

[73] Assignee: Firma Obo Bettermann OHG, Fed. Rep. of Germany

[21] Appl. No.: 252,065

[22] Filed: Apr. 8, 1981

[30] Foreign Application Priority Data

Apr. 16, 1980 [DE] Fed. Rep. of Germany ....... 3014583

[51] Int. Cl.³ ............................................... B23K 9/20
[52] U.S. Cl. ...................................................... 219/98
[58] Field of Search .................................... 219/98, 99

[56] References Cited

U.S. PATENT DOCUMENTS

| 2,268,416 | 12/1941 | Nelson | 219/98 |
| 3,694,611 | 9/1972 | Ettinger | 219/98 |
| 3,723,700 | 3/1973 | Ettinger | 219/98 |
| 4,160,148 | 7/1979 | Jenkins | 219/98 |

FOREIGN PATENT DOCUMENTS 1017688 1/1966 United Kingdom .................. 219/98

Primary Examiner—B. A. Reynolds
Assistant Examiner—Alfred S. Keve
Attorney, Agent, or Firm—Jacobs & Jacobs

[57] ABSTRACT

Stud welding apparatus having a clamping sleeve at one end of the apparatus, a delivery tube or passage coaxially of the sleeve, an inlet for a succession of studs in communication with a stud feed and a displaceable setting or holding member for forcing a stud in the stud delivery passage into the stud clamping sleeve, and the setting member having a displacement at least as long as a stud. The succession of studs is fed in such manner that even prior to the termination of the welding process of one stud held in the clamping sleeve the following stud is properly positioned in the stud delivery passage and is introduced into the stud clamping sleeve when the latter is in its return position.

22 Claims, 10 Drawing Figures

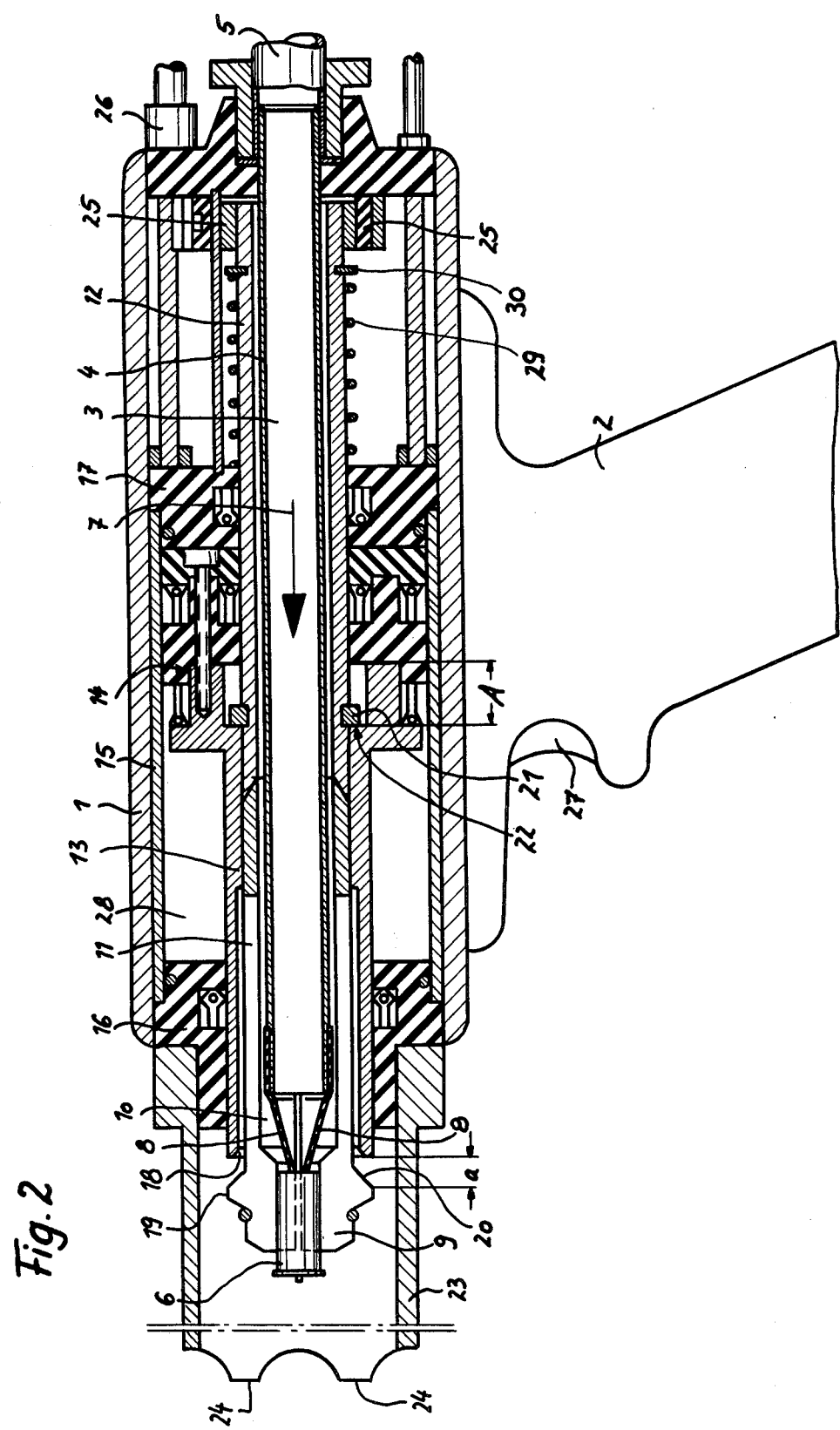

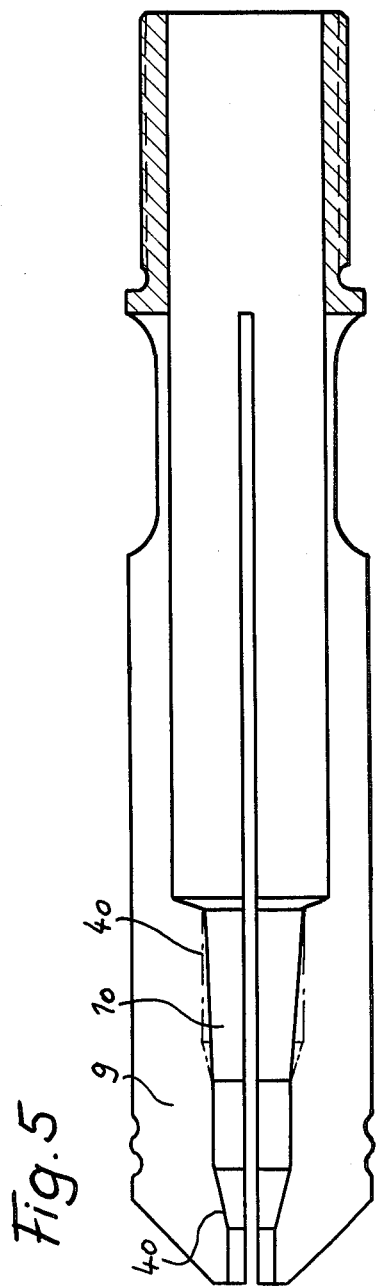
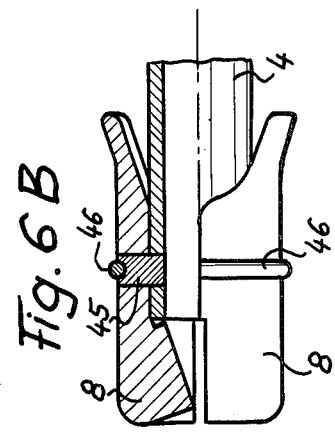
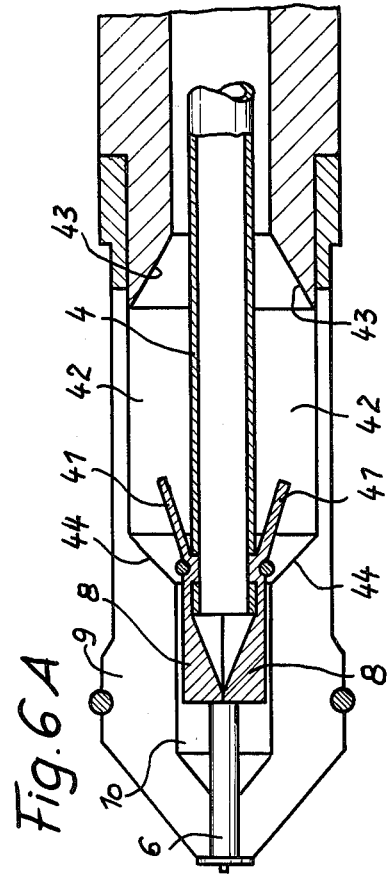

STUD WELDING APPARATUS

The present invention relates to stud welding apparatus having a stud clamping sleeve arranged at one end of the apparatus, a stud delivery passage extending coaxially with respect to said sleeve, a stud inlet which is in communication with a stud feed and a setting member which urges a stud present in the stud delivery passage into the stud clamping sleeve, the displacement of said setting member corresponding at least to the length of the stud.

In a stud welding apparatus of this general type known from West German Pat. No. 22 58 908, the stud setting member is constructed as a ram which is displaceable coaxially to the stud clamping sleeve and the stud inlet debouches into the stud delivery passage between the stud clamping sleeve and the stud setting member which is in the rear-end position, the stud inlet being directed at an acute angle to the axial direction of the stud delivery passage.

This, however, has the disadvantage that only relatively short studs can be introduced into the stud delivery passage. Furthermore, this apparatus results in a relatively long structural length. While West German unexamined application for Patent 26 04 065 discloses measures for avoiding these disadvantages in such manner that the stud inlet is arranged to extend paraxially to the ram-shaped stud setting member and, in order to introduce a stud into the stud delivery passage or to force a stud present in the stud delivery passage into the stud clamping sleeve, the stud setting member and the stud inlet are arranged for joint lateral displacement in such manner that either the stud inlet or the stud setting member is coaxially opposite the stud clamping sleeve.

However, that stud clamping apparatus, due to a large number of operating strokes, has an even longer operating cycle time than the apparatus in accordance with the aforementioned German Patent.

The object of the present invention is to devise a relatively simple stud welding apparatus of the above described type with the possibility of a considerable reduction in its operating cycle time, in which connection a highly secure holding of the stud in position is assured during the welding and the use of studs of even great length is possible.

This object is achieved in accordance with the invention in such manner that the feeding of a stud takes place in a manner that even before the termination of the welding process of a stud held in the stud clamping sleeve the following stud is properly positioned in the stud delivery passage and, upon the return movement of the stud clamping sleeve, introduced into the latter.

For this purpose the setting member is passed through by a channel forming the stud inlet and furthermore the setting member is formed at its end part facing the stud clamping sleeve in such manner as to be passable for a stud in the feed direction but to block the stud in the opposite direction.

Thus, the welding stroke and the feed stroke for the introduction of a stud into the stud delivery passage can now be superimposed on each other, resulting in a previously unattained shortness of the operating cycle time.

Furthermore, a stud can now be introduced into the stud delivery passage without change in direction.

The stud setting member is preferably arranged fast on the frame while the stud clamping sleeve is displaceable axially relative to the setting member by an amount of which at least corresponds to the length of a stud.

In this way there is achieved the possibility of obtaining a particular short structural length of the apparatus.

One advantageous further development of the object described above consists in the provision of a stud clamping-sleeve tightening device which is displaceable coaxially to the stud clamping sleeve by a stud clamping sleeve setting member and acts in form-locked manner, said tightening device being so developed in each case to act as leading with respect to the stud clamping sleeve.

This has the advantage that in order to obtain the fastening of a stud in proper position during the welding stroke the closed position of the sud clamping sleeve can now be assured automatically and positively in a form-locked manner without manual intervention.

One preferred embodiment is characterized for this purpose by the fact that the stud clamping sleeve is mounted for axial displacement in a bushing arranged coaxially to the sleeve and axially displaceable in the apparatus housing and the bushing furthermore is provided with a conically flaring end at the end facing the mouth of the stud clamping sleeve, and furthermore on the cylindrical wall of the stud clamping sleeve there is arranged a shoulder which corresponds to the aforementioned bushing end, the flank of which shoulder facing the bushing is formed ascending obliquely outwards to the mouth of the stud clamping sleeve and on the stud clamping sleeve, spaced axially from the shoulder thereof, there is a driver member which cooperates with a stop on the bushing, the axial distance of which driver member from the shoulder is greater than the axial distance from the bushing stop to the conically-widened, bushing-end surface.

In this connection it is advantageous to provide as a setting member for the bushing and the stud clamping sleeve a working cylinder which can be actuated in particular by compressed air and the piston of which, through which the stud clamping sleeve passes, bears the bushing so that the same form of energy, preferably compressed air, can be used not only for the conveying of the studs into the stud delivery passage but also for the movements of the stud setter. Furthermore, a compact and strong construction of the apparatus can thereby be obtained.

A preferred embodiment of the device provides an arrangement at the end of the stud inlet which permits a stud to pass in feed direction but locks the stud against passing in the opposite direction, as hereinafter set forth.

Other advantageous embodiments of the inventive object described above and which favor the arrangement in proper position on a workpiece are also set forth hereinafter.

A form of the above-described object which at little expense increases the closing force of the stud clamping sleeve is also described hrerinafter.

The form of invention wherein a coil spring helically encircles the tube is particularly preferred as is also preferred the tongue arrangement and the form and movements of the individual tongues, as a result of which even extremely narrow and/or short studs can be held in proper position with respect to the stud clamping sleeve in the stud delivery passage.

Various illustrative embodiments of the invention are shown in the accompanying drawings and are described below:

FIG. 2 shows in longitudinal section a modified form of the stud welding apparatus of FIG. 1;

FIG. 5 shows a varient form of stud clamping sleeve in longitudinal section;

FIG. 6A shows a variant form, in longitudinal section, of device for feeding a stud to the stud clamping sleeve; and FIG. 6B shows a modification of certain details of FIG. 6A, partly in longitudinal section and partly in front view.

Figure 1:
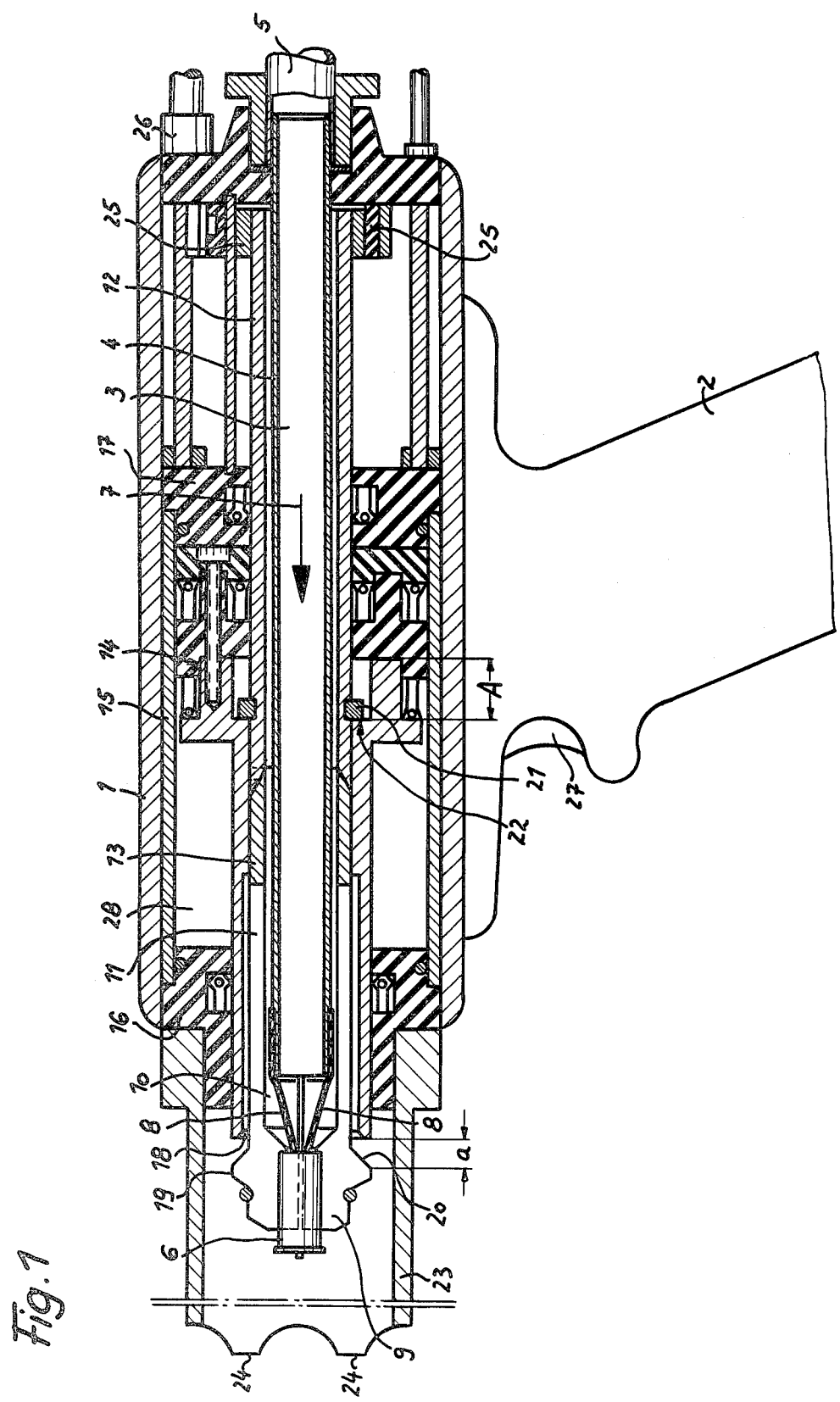
FIG. 1 shows in longitudinal section a stud welding apparatus according to the present invention.

A stud welding apparatus, according to the present invention, comprises an elongated housing 1 of rectangular cross-section having a pistol grip or handle 2 and through which extends an axially disposed tubular member 4 which forms a stud inlet and which is traversed by a channel or bore 3, said tubular member being fastened at one end in the housing 1, at which end of said member there is connected stud-feed means 5, shown only fragmentarily, which means can be operated in known manner by compressed air to intermittently feed a succession of studs 6 in the direction indicated by the arrow 7 in a predetermined rhythm.

At the free-end of the tubular member 4 there are fastened tongues 8, distributed on the circumference, which taper toward each other and which can spread apart under the action of spring tension.

Behind the tongues 8, as viewed in the direction of conveyance of studs 6, there is arranged a stud clamping sleeve 9 having a tubular shank portion 11 which forms a stud delivery passage 10, the tubular shank portion being disengageably connected with a tube 12 having its diameter profiled in the same manner as the shank portion.

The connection is constructed as a bayonet lock so that the stud clamping sleeve 9, if necessary, can be replaced by a similar stud support of smaller or larger profile.

The stud clamping sleeve unit 9, 11, 12 is supported for axial displacement in a bushing 13 which is fastened at one end to a piston 14 of a pneumatic working cylinder which can be acted upon on both sides by compressed air, said piston being axially displaceable in the housing 1.

The piston 14 is mounted in a cylinder 15 secured in the housing 1. The piston 14 and its cylinder-end walls 16 and 17 consist of insulating material.

The free-end of the bushing 13 is mounted in axially displaceable, tightly sealing fashion in a borehole in the endwall 16, and the tube 12 passes in axially displaceable, tightly sealing manner through a borehole in the end-wall 17.

At its free-end the bushing 13 has a conically widened or outwardly bevelled end 18 corresponding to a shoulder or projection 19 formed on the stud clamping sleeve 9, the flank 20 of which shoulder facing toward the bushing 13 being outwardly flaring in conically extending form.

The conical angles of the bushing-end 18 and of the flank 20 are the same.

In the region facing the stud clamping sleeve 9, the bushing 13 is arranged to have clearance with respect to the stud clamping sleeve 9, 11 so that the latter can spread out radially against spring tension. Furthermore, there is provided on the stud clamping sleeve unit 9, 11, 12 an annular drive member 21 which cooperates with a stop 22 on the bushing 13, the axial distance of the bushing-end 18 from the bushing-stop 22 being less than the axial distance of the shoulder 9 from the drive member 21, the distance "A" being greater than the distances "a" as shown in FIGS. 1 and 2.

The stud clamping sleeve 9 extends out of the apparatus housing 1 and is surrounded by a tubular apparatus support 23 arranged coaxially to said clamping sleeve and secured on the housing 1 and having resting surfaces 24 at a right angle to the longitudinal axial direction of the stud clamping sleeve 9.

The stud clamping sleeve unit 9, 11, 12 is electrically conductive and can be insulated both from the tubular member 4 and electrically insulated also from the apparatus housing 1 and is permanently connected to an electric feed line 26 by means of an annular flexible contact bridge 25.

Further electric and pneumatic control devices (not shown) are provided which can be arranged at least partly in the pistol grip or handle 2, of the type known for instance, from West German Pat. No. 22 58 908. The conduits can, in this connection, be arranged outside the space occupied by the parts 9, 11, 12, 13 14 in the corners of the rectangular housing 1.

If, as shown in the drawings, a stud 6 to be welded to a workpiece (not shown) is in the stud clamping sleeve 9 and upon actuation of the trigger 27, the piston 14 is first moved pneumatically to the left under the action of the electric and pneumatic sequence controls.

In this connection, the bushing-end 18 first comes against the flank 20 and thus locks the closed position of the bolt clamping sleeve 9 in form-locked manner and carries the stud clamping sleeve 9 along until the stud 6 has reached its welding position. Thereupon, an electric welding voltage is applied to the stud clamping sleeve unit 9, 11, 12 under the control of the circuit.

During this time, another stud (not shown) is conveyed pneumatically through the channel 3 into the stud delivery passage 10, the stud temporarily spreading the tongues 8 apart, said tongues again automatically assuming their original position, shown in the drawing, after the passage of the stud.

All of these procedures take place during the welding stroke. If the latter is terminated in known manner under the control of a time switch (not shown), the stroke space 28 of the working cylinder which faces the stud clamping sleeve 9 will be acted on by compressed air as a result of which the piston 14 will be pushed to the right into its initial position. In this manner the bushing-end wall 18 is, first of all, detached from the flank 20 and opens the closed position of the stud clamping sleeve 9.

Thereupon, the bushing-stop 22 abuts against the driver member 21 so that the stud clamping sleeve unit 9, 11, 12 is moved back into the starting position and is thereby withdrawn from the welded stud 6. In this connection and during the return stroke of the stud clamping sleeve unit 9, 11, 12, the stud present in the stud delivery passage 10 is forced into the stud clamping sleeve 9, the rear end of the stud resting against the tongues 8 which are present in the stud-blocking position.

Dispensing with the form-locked safety of the stud clamping sleeve, a stud welding apparatus in accordance with West German Pat. No. 22 58 908 can also possibly be developed in accordance with the invention is such manner that here the studs are conveyed by the hollow axially displaceable setting member into the stud delivery passage during the welding process, the setting member being in its rear-end position.

Furthermore, in this case also, the end portion of the setting member facing the stud clamping sleeve must be developed so that it can be passed in the stud feed direction but blocks the stud in the opposite direction.

As can be observed in the modified form of the invention of FIG. 2, a coil compression spring 29 is arranged on the tube 12 which is detachably connected via the tube shank 11 to the stud clamping sleeve 9, the spring resting under initial spring tension at one end against the cylinder-end wall 17 and at its other end against a tube shoulder 30 so that this spring 29 at all times exerts a force directed towards the bushing-end 18 on the stud clamping sleeve 9.

This results, as compared with the embodiment of FIG. 1, in a substantially higher closing force which can be exerted by the stud clamping sleeve 9 on a stud 6 present in it which makes it possible to dispense with the shoulder visible in FIG. 1 of the stud clamping sleeve 9 which cooperates with the rear end of a stud 6 held in the stud clamping sleeve.

Figure 3A:
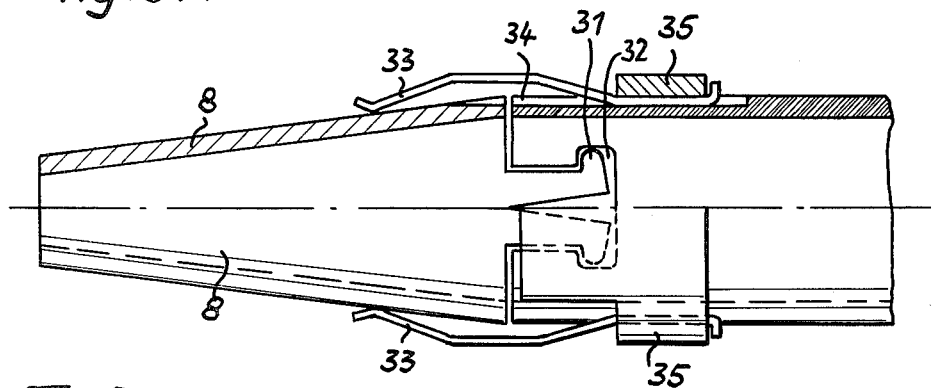
FIG. 3A is a front view partially broken away of details of the stud feed on an enlarged scale.
Figure 3B:
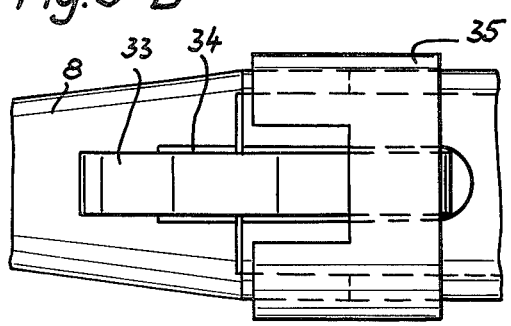
FIG. 3B is a plan view of FIG. 3A.
Figure 3C:
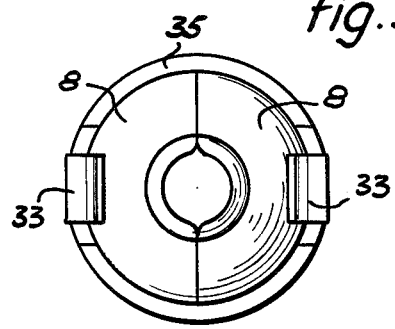
FIG. 3C is a side view of FIG. 3A.

FIGS. 3A to 3C show in an enlarged scale spreadably mounted tongues 8 arranged on the free end of the tubular member 4, the tongues being formed and disposed in such manner that two tongues supplement each other in the closed position to form a conically tapering tube. On both tongues 8 are hook-shaped hinge parts 31 which are inserted with a hinge movement into corresponding recesses 32 in the wall of the member 4.

Furthermore, in this case, for each tongue 8 there is provided a slightly bent flexure spring 33 of steel, each of which springs has its one end fastened to the member 4 and rests with its free-end under spring tension against the tongue 8, thus continuously urging the tongues 8 towards each other.

The ends of the flexure springs 33 which face the member 4 are inserted in form-locked manner in longitudinally extending grooves 34 having the same profile as said springs and are detachably fastened therein by means of a common clamping ring 35. In order to fix the flexure spring 33 with respect to the clamping ring 35 in axial direction, the flexure springs have bentup end portions which rest against the rear side of the clamping ring 35.

Figure 4A:
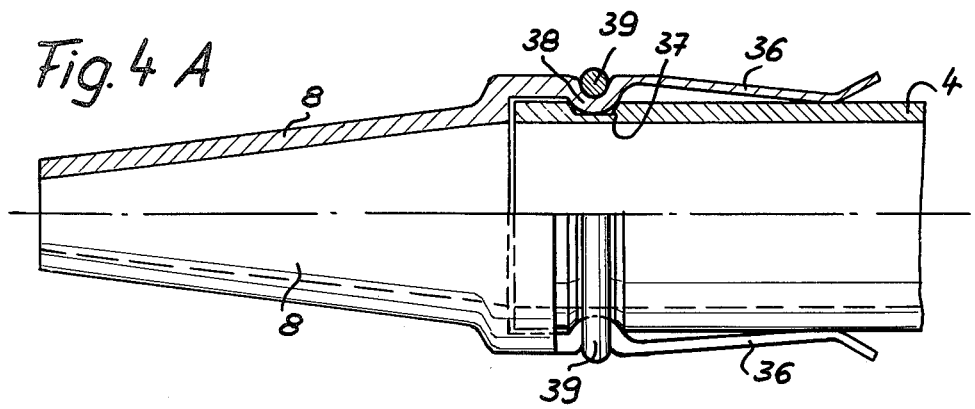
FIG. 4A shows a varient form of the stud-free details of FIG. 3A in front view and partially broken away.
Figure 4B:
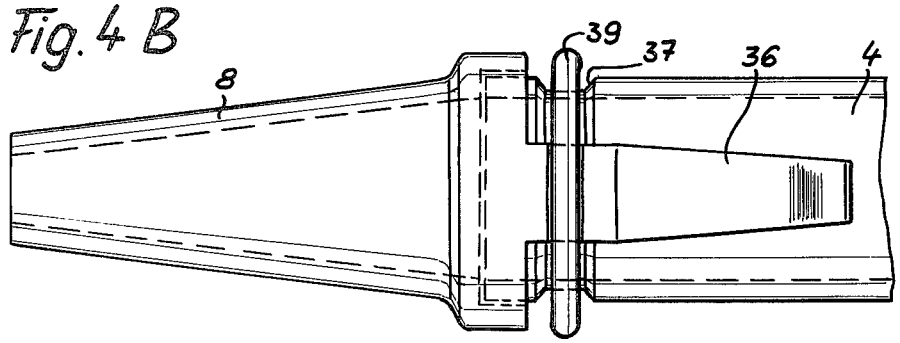
FIG. 4B is a plan view of FIG. 4A.

The tongues 8 shown in FIGS. 4A and 4B consist of resilient plastic and each has a flexure spring 36 thereon.

In their mounting on the member 4, near the free end of the latter, there is provided a circumferential groove 37. Furthermore, each of the flexure springs has a crimp which engages with a hinge movement into said groove, within which groove is disposed a clamping ring 39 which surrounds both flexure springs 36.

The modified stud clamping sleeve 9 shown in FIG. 5 has, in the stud delivery passage 6, two conically narrowing zones 40 which are arranged in spaced-apart relation one behind the other in the direction of transport of the studs, the cone angles of which zones do not exceed 30°. In these zones 40, each of the studs positioned in the stud delivery passage 10 can be clamped temporarily in correct position, i.e., aligned coaxially, during the welding-on of a stud held in the stud clamping sleeve 9.

In FIGS. 6A and 6B tongues 8, which are positively controlled by relative movement of the stud clamping sleeve 9 with respect to the member 4, are provided on the member 4.

For this purpose, tilting levers 41 are provided on the tongues 8. These levers engage into sleeve slots 42 and upon the displacement of the stud clamping sleeve 9 travel forward against oblique stop surfaces 43. This has the result that in such case the tongues 8 are spread apart.

If the stud clamping sleeve 9 is thereupon shifted into the starting position, the tongues 8 which travel onto the front-stop surfaces 44 are positively pressed together.

FIG. 6B shows a modification in which the front edges of the tongues 8 and rounded in order to facilitate the closing of the tongues 8 during the return of the stud clamping sleeve 9 into its starting position.

In this connection, for the mounting with hinged movement of at least one of the tongues on the member 4 there is provided a radially extending stud 45 which engages into a borehole in the tongue. Furthermore, a clamping ring 46 is provided which surrounds both tongues 8 with initial spring tension and rests in circumferential grooves of the tongues 8.

The invention is understood to comprise all novel, individual and combinations of features and elements disclosed in the specification and/or drawing.

I claim:

1. A stud welding apparatus comprising an elongated housing, tubular member extending axially therethrough to form a stud inlet having a bore and which tubular member is fastened at one end in the housing at which end is fastened a stud feed means, tongues fastened at the other end of the tubular member and tapering toward each other under spring tension, a stud clamping sleeve behind the tongues and having a tubular shank portion forming a stud delivery passage disengageably connected to a tube in a space in the housing adjacent the stud feed means, and means for feeding a succession of studs through the stud delivery passage.

2. A stud welding apparatus according to claim 1, wherein means is provided for permitting passage of a stud in the direction of feed and blocking the stud against movement in the opposite direction.

3. A stud welding apparatus according to claim 1, wherein the stud inlet is securely fastened to the apparatus frame and the stud clamping sleeve is displaceable axially relative to the stud inlet by an amount which at least corresponds to the length of the stud.

4. A stud welding apparatus according to claim 3, wherein the stud clamping-sleeve has a tightening device which is displaceable coaxially with respect thereto.

5. A stud welding apparatus according to claim 4, wherein the stud clamping sleeve is mounted for axial displacement in a bushing arranged coaxially to said sleeve and axially displaceable in the housing of the apparatus, and bushing being provided at the end thereof facing the mouth of the stud clamping-sleeve with a conically flaring end, a cylindrical wall of the stud clamping sleeve being provided with a shoulder which corresponds to the bushing end surface, the flank of said shoulder which faces the bushing being shaped as flaring obliquely outwards to the mouth of the stud clamping sleeve, and, on the stud clamping sleeve, spaced axially from its shoulder, a driver member is disposed which cooperates with a stop on the bushing and the axial distance of which from the shoulder is greater than the axial distance from the bushing stop to the conically widened bushing end surface.

6. A stud welding apparatus according to claim 1, wherein the stud clamping sleeve is provided with a working cylinder located within the housing and having a piston actuated by a source of compressed air and which piston bears against the bushing.

7. A stud welding apparatus according to claim 5, wherein the apparatus housing has arranged thereon an apparatus support which extends beyond the stud clamping sleeve and has supporting surfaces arranged at right angles to the axial direction of the stud clamping sleeve.

8. A stud welding apparatus according to claim 7, wherein a tubular housing is provided and arranged coaxially relative to the stud clamping sleeve.

9. A stud welding apparatus according to claim 1, wherein a spring element is associated with the stud clamping sleeve which is positively tensioned upon displacement into welding position and holds the stud clamping sleeve tightly.

10. A stud welding apparatus according to claim 1, wherein a coil spring is arranged on the tube, said spring resting at one end against a tube shoulder and at the other end against a cylinder end wall of a working cylinder which acts on the bushing of the stud clamping sleeve.

11. A stud welding apparatus according to claim 1, wherein the tongues are shaped as half-shells which supplement each other to form a tube cone which narrows in the direction of conveyance of the stud.

12. A stud welding apparatus according to claim 11, wherein hinge parts are formed on the tongue ends which face the stud inlet member, said hinge parts being swingably inserted in recesses conformal thereto around axes extending transversely to the longitudinal dimension of said recesses and spring elements mounted on the member and which act on the tongues.

13. A stud welding apparatus according to claim 12, wherein the spring elements are substantially completely extended, flexure springs arranged approximately paraxially to the member and fastened at one end to the member and rest under initial spring tension against the tongues by parts which extend up into the region of the tongues.

14. A stud welding apparatus according to claim 13, wherein the parts of the flexure springs mounted on the member are located in longitudinally extending grooves of identical profile in the member and are surrounded by a clamping ring.

15. A stud welding apparatus according to claim 13, wherein the tongues have paraxially extending flexure springs formed thereon which rest with initial tension against the member.

16. A stud welding apparatus according to claim 15, wherein the member is provided near the end thereof facing the stud clamping sleeve with a circumferential groove, the flexural springs thereon having crimps which are pressed therein towards the member and extend in the same direction as the groove to engage with a hinge movement into the groove of the member, the flexure springs being surrounded by a common clamping ring arranged with initial tension and engaging into the crimp grooves.

17. A stud welding apparatus according to claim 13, wherein means is provided for positively opening and closing the tongues which are controlled by the stud clamping sleeve by means of relative movements of the latter with respect to the member.

18. A stud welding apparatus according to claim 17, wherein outwardly-directed, tilt levers extend from the tongues and with which levers are associated oblique stop-surfaces provided in the stud clamping sleeve and arranged so that in the direction of displacement of the stud clamping sleeve they approach the axis thereof.

19. A stud welding apparatus according to claim 1, wherein the stud delivery passage in the stud clamping sleeve has, distributed on its circumference, clamping surfaces which correspond to a stud and approach each other in the direction of transport of the stud, which clamping surfaces, when the stud clamping sleeve is opened, release the clamped stud.

20. A stud welding apparatus according to claim 19, wherein the stud delivery passage narrows down conically in the direction of transport of the studs and has at least one conically tapering zone with a cone angle of about 30° or less.

21. A stud welding apparatus having a stud clamping sleeve at one end thereof, a stud delivery passage extending coaxially of the sleeve, a stud inlet communicating with a stud feed and a displaceable setting member which forces a stud present in the stud delivery passage into the stud clamping sleeve, thereby displacing said setting member a distance at least that of the length of the stud, means for feeding a stud in such manner that, prior to the termination of the welding process of a preceding stud held in the stud clamping sleeve, the following stud is positioned in the stud delivery passage for introduction into the stud clamping sleeve upon the return position of the sleeve, a spring element associated with the stud clamping sleeve which is positively tensioned upon the displacement into welding position and applies the stud clamping sleeve against a stud clamping sleeve tightening device, and a coil sprin encircling the tube connected to the clamping sleeve and arranged coaxially thereto with said spring resting at one end against a tube shoulder and at the other end against the cylinder of a working cylinder which acts on the bushing of the stud clamping sleeve tightening device.

22. A stud welding apparatus according to claim 21 wherein the coil spring is helical and is a compression spring arranged on a tube which is detachably connected by the tube shank to the stud clamping sleeve, the said spring resting under initial spring tension at one end against a cylinder end wall and at its other end against a tube shoulder whereby the spring continuously exerts a force directed toward the bushing end on the stud clamping sleeve.

* * * * *